OBED FAHNESTOCK.
Improvement in Tray Holders.
No. 124,730. Patented March 19, 1872.
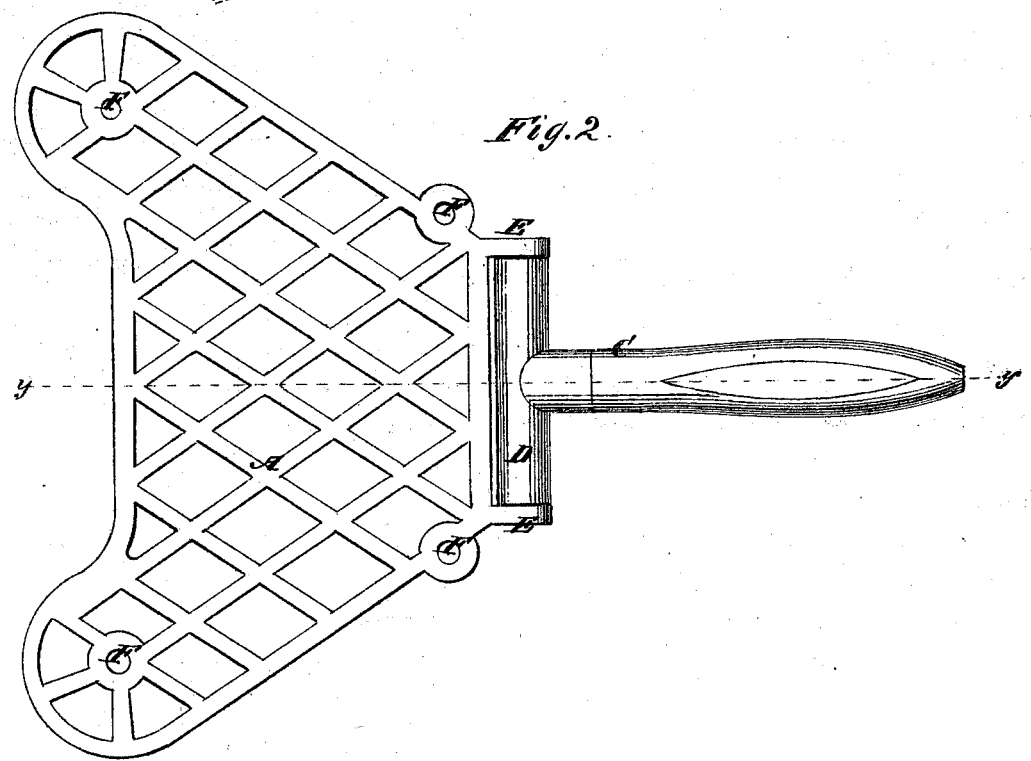

UNITED STATES PATENT OFFICE.

OBED FAHNESTOCK, OF INDIANAPOLIS, INDIANA.

IMPROVEMENT IN TRAY-HOLDERS.

Specification forming part of Letters Patent No. 124,730, dated March 19, 1872.

Specification describing a new and Improved Tray-Holder, invented by OBED FAHNESTOCK, of Indianapolis, in the county of Marion and State of Indiana.

My invention consists of a small horizontal lattice-frame of metal, with a handle at one side, and short legs on the bottom with screw-threaded holes formed in them from the top, on which the tray is fastened by screws; or it may be rivets entering said holes; and the handle is arranged so that it may be taken in the hand to hold the tray while resting on the arm behind, the hand grasping said handle to enable one to hold the loaded tray by one hand, and allow of using the other for other things.

Figure 1 is a sectional elevation of the tray-holder on the line $y\ y$ of Fig. 2, and Fig. 2 is a plan view.

Similar letters of reference indicate corresponding parts.

A is the metal lattice-frame, with legs B and a handle, C. The latter is attached to a shaft, D, which is pivoted to ears E projecting at one side, in such manner that the handle may be turned downward under the bottom between the legs, as shown by dotted lines in Fig. 1, to be taken by the hand of the arm on which the tray is carried. The tray will be fastened on the frame by screws, rivets, or the like, passing through holes in the bottom and into the holes F of the legs. The handle being thus pivoted will turn up against the bottom of the frame between the legs, out of the way, when set upon a table; or it may be turned out the other way, if preferred; and, by reason of being pivoted, it allows the tray to be more or less back of the hand, as may happen in adjusting it.

Having thus described my invention, I claim as new and desire to secure by Letters Patent—

A tray-holder, consisting of a frame or stand, A, and a handle, C, pivoted to said frame in the manner described.

OBED FAHNESTOCK.

Witnesses:
GEO. K. PERRIN,
WM. SULLIVAN.